United States Patent [19]

Kuisl

[11] Patent Number: 4,735,643
[45] Date of Patent: Apr. 5, 1988

[54] METHOD FOR PRODUCING AN AEROSOL STREAM

[75] Inventor: Max Kuisl, Ulm, Fed. Rep. of Germany

[73] Assignee: Licentia Patent-Verwaltungs-GmbH, Frankfurt am Main, Fed. Rep. of Germany

[21] Appl. No.: 898,406

[22] Filed: Aug. 20, 1986

[30] Foreign Application Priority Data

Aug. 23, 1985 [DE] Fed. Rep. of Germany ....... 3530153

[51] Int. Cl.$^4$ ..................... C03B 19/06; C03B 37/075
[52] U.S. Cl. ...................... 65/3.12; 65/18.2; 350/96.34; 427/27; 427/163
[58] Field of Search .................. 427/27, 163; 65/3.12, 65/18.2, 32; 350/96.34

[56] References Cited

U.S. PATENT DOCUMENTS

| | | | |
|---|---|---|---|
| 4,310,341 | 1/1982 | Barns et al. | 65/3.12 |
| 4,402,720 | 9/1983 | Edahiro et al. | 65/3.12 |
| 4,417,911 | 11/1983 | Cundy et al. | 65/3.12 |
| 4,465,708 | 8/1984 | Fanucci et al. | 427/163 |
| 4,473,599 | 9/1984 | Elion | 427/163 |
| 4,597,983 | 7/1986 | Kühne et al. | 427/27 |

FOREIGN PATENT DOCUMENTS

| | | |
|---|---|---|
| 0081282 | 9/1982 | European Pat. Off. . |
| 3037491 | 4/1981 | Fed. Rep. of Germany . |
| 3326043 | 2/1985 | Fed. Rep. of Germany . |

*Primary Examiner*—Thurman K. Page
*Attorney, Agent, or Firm*—Spencer & Frank

[57] ABSTRACT

A method for producing an aerosol stream, particularly an aerosol stream suitable for the production of a preform for an optical fiber. At least two gas phase reactants are reacted in a reaction chamber to form the aerosol stream. Undesirable deposition of liqid or solid reaction products, particularly at the point of entry into the reaction chamber, is avoided by the addition of at least one gas phase product to at least one of the gas phase reactants.

13 Claims, No Drawings

METHOD FOR PRODUCING AN AEROSOL STREAM

BACKGROUND OF THE INVENTION

1. Field of the Invention

The present invention relates to a method for producing an aerosol stream. The invention relates, in particular, to the production of an aerosol stream containing glass forming $SiO_2$ particles suitable for the production of a preform for optical fibers.

2. Technology Review

U.S. Pat. No. 4,597,983 by Kuhne discloses, for example, the production of an aerosol stream by means of a flameless chemical reaction of the gaseous and/or vaporous components silicon tetrachloride ($SiCl_4$) and water ($H_2O$) according to the following formula:

$$SiCl_4 + 2\,H_2O \rightarrow SiO_2 + 4\,HCl$$

It is further known to use additional components, e.g. $GeCl_4$, to obtain doping of the resulting $SiO_2$ particles. The result is, for example, germanium dioxide according to the following formula:

$$GeCl_4 + 2\,H_2O \rightarrow GeO_2 + 4\,HCl$$

These chemical reactions take place in a heatable reaction chamber which has, for example, a tubular configuration or is an open burner. In the latter case, it is advisable to preheat the reacting components and/or the burner so that the required reaction temperature exists at the point where the components exit.

These methods have the common feature that the components are initially supplied separately, e.g. in concentrically arranged pipes, to point of entry into the reaction chamber in which the aerosol stream is created. Particularly for the production of preforms for optical fibers, it is necessary for the aerosol stream to have as uniform as possible a concentration of $SiO_2$ particles over its cross-sectional area and is additionally a laminar flow.

In general, a uniform aerosol stream requires a uniform, laminar gas flow of all components and their most complete mixing possible. A laminar stream usually requires slow gas flow velocities and careful configuration of the point of entry into the reaction chamber. Mixing results from diffusion perpendicularly to the direction of gas flow.

However, these prior methods have the drawback that the components are mixed through so quickly that, in an undesirable manner, a reaction product is formed at the point of entry and this reaction product is not transported along with the aerosol stream in the form of small particles but instead is deposited as a solid at the point of entry. Consequently there occurs a mechanical change which interferes in an unpredictable manner with the uniformity of flow. It is even possible that the point of entry may become clogged.

These drawbacks can be overcome by a high flow velocity which quickly transports the components away from the point of entry before they are mixed through. However, the flow velocities required for this purpose are so high that the desired laminar flow changes to an undesirable turbulent flow. This disadvantage can be avoided by spatially separating the components at the point of entry, for example with the aid of an inert gas conducted between the components. This extends the diffusion path so that even with slow flow velocities, mixing and reaction between the components do not occur until some distance from the point of entry. However, the amount of apparatus required for such an arrangement is uneconomically high particularly for industrial production, primarily if the resulting aerosol must have a high degree of purity.

SUMMARY OF THE INVENTION

The present invention provides a method of producing an aerosol stream which avoids deposition of liquid or solid particles at the point of entry into the reaction chamber. The method includes introducing at least two gaseous and/or vaporous chemical components which react to form an aerosol stream containing liquid or solid particles and a gaseous reaction product at a point of entry into a reaction chamber, and simultaneously introducing a stream of the gaseous reaction product at the point of entry in an amount sufficient to avoid deposition of liquid or solid particles at the point of entry.

It is therefore an object of the invention to improve a method of this type so that economical and reliable production of an aerosol stream becomes possible, particularly for industrial mass production, with such a stream having a high particle concentration and moving in a laminar flow.

DETAILED DESCRIPTION OF THE INVENTION

The invention will now be described in greater detail with reference to an illustrative embodiment.

To produce a laminar aerosol stream containing $SiO_2$ particles suitable for the production of a preform for an optical fiber and developed according to the abovementioned reaction, a small quantity of hydrogen chloride (HCl) is mixed with at least one of the gaseous components, e.g. the gaseous $SiCl_4$, so that a mixing ratio of about 0.1 liter HCl/min to about 2 liter $SiCl_4$/min results. For example, gaseous HCl from a steel bottle can be added in a precisely measured quantity to the gaseous $SiCl_4$. In this way, deposition of reaction products at the point of entry is avoided. The added hydrogen chloride does not interfere with the desired chemical reaction since it is produced in any case as a reaction product in the reaction of $SiCl_4$.

It is also possible to add a further hydrogen halide, e.g. hydrogen fluoride (HF), to the hydrogen chloride. In this way it is possible to correspondingly dope the $SiO_2$ particles.

The invention is based on the knowledge that the chemical reactions described in the aforementioned formulas are reversible and go in either direction. The principal direction of the reaction depends on the relative concentration of the reactants and the products of the reaction. If a portion of one of the reaction products, for example HCl, is mixed with one of the starting reactants, for example $SiCl_4$, then the reaction is delayed at the point of entry. In this way the deposition of particles at the point of entry is avoided.

The present disclosure relates to the subject matter disclosed in application No. P 35 30 153.8 filed in the Federal Republic of Germany on Aug. 23, 1985, the entire specification of which is incorporated herein by reference.

The present invention is not limited to the described embodiments but can be used similarly in others. For example, in the so-called flame hydrolysis processes for the production of $SiO_2$ particles it is advisable to add hydrogen halide to at least one of the gaseous components in such a concentration that the required burner will not be encrusted by reaction products, and/or complicated burner structures having a partition of inert gas between the two components, $SiCl_4$ and $O_2$ and $H_2O$, respectively, are avoided.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty.

What is claimed is:

1. A method of producing an aerosol stream, comprising steps for:
   introducing at least two gas phase reactants, capable of reacting to form an aerosol containing glass-forming particles suspended in a gas phase product, into a reaction chamber at a point of entry,
   introducing at least one gas phase hydrogen halide into said reaction chamber at said point of entry in an amount effective to avoid deposition of glass-forming particles at said point of entry, and
   reacting said gas phase reactants in said reaction chamber to form an aerosol containing glass-forming particles suspended in a hydrogen halide gas phase product without depositing said glass-forming particles at said point of entry.

2. The method for producing an aerosol stream as set forth in claim 1, wherein one of said gas phase reactants is silicon tetrachloride.

3. The method for producing an aerosol stream as set forth in claim 1 wherein said hydrogen halide is hydrogen chloride.

4. The method for producing an aerosol stream as set forth in claim 1, wherein said gas phase reactants capable of producing an aerosol include silicon tetrachloride and water.

5. The method for producing an aerosol stream as set forth in claim 1, including using said aerosol stream to produce a preform for an optical fiber.

6. A method for producing an aerosol stream, comprising steps for:
   introducing at least two gas phase reactants, capable of reacting to form an aerosol containing liquid or solid particles suspended in a gas phase product, into a reaction chamber at a point of entry,
   introducing at least one gas phase product into said reaction chamber at said point of entry in an amount effective to avoid deposition of liquid or solid particles at said point of entry, and
   reacting said gas phase reactants in said reaction chamber, to form an aerosol containing liquid or solid particles suspended in a gas phase product without depositing said liquid or solid particles at said point of entry.

7. The method for producing an aerosol stream set forth in claim 6, wherein said aerosol contains solid particles suspended in a gas phase product.

8. The method for producing an aerosol stream set forth in claim 7, wherein said solid contains glass-forming particles.

9. The method for producing an aerosol stream set forth in claim 8, including a step for producing a preform for an optical fiber from said aerosol stream containing glass-forming particles.

10. The method for producing an aerosol stream set forth in claim 6, wherein said gas phase reactants include silicon tetrahalide and water vapor.

11. The method for producing an aerosol stream set forth in claim 10, wherein said gas phase product includes a gaseous hydrogen halide.

12. The method for producing an aerosol stream set forth in claim 6, wherein said gas phase reactants include silicon tetrachloride and water vapor.

13. The method for producing an aerosol stream set forth in claim 12, wherein said gas phase product includes gaseous hydrogen chloride.

* * * * *